July 12, 1949.  P. D. BALZANO  2,475,688
AIRPLANE SAFETY DEVICE
Filed May 22, 1945  2 Sheets-Sheet 1
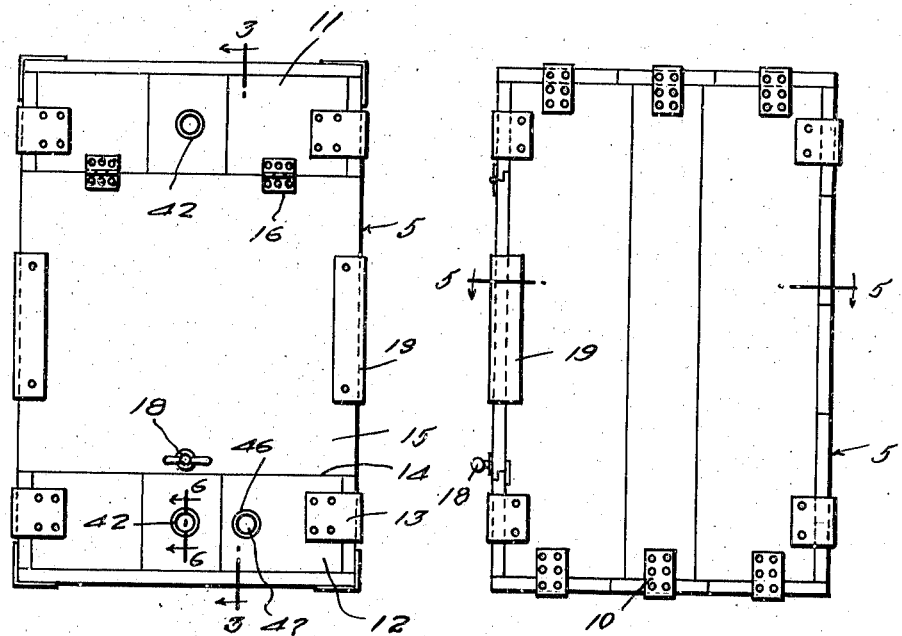
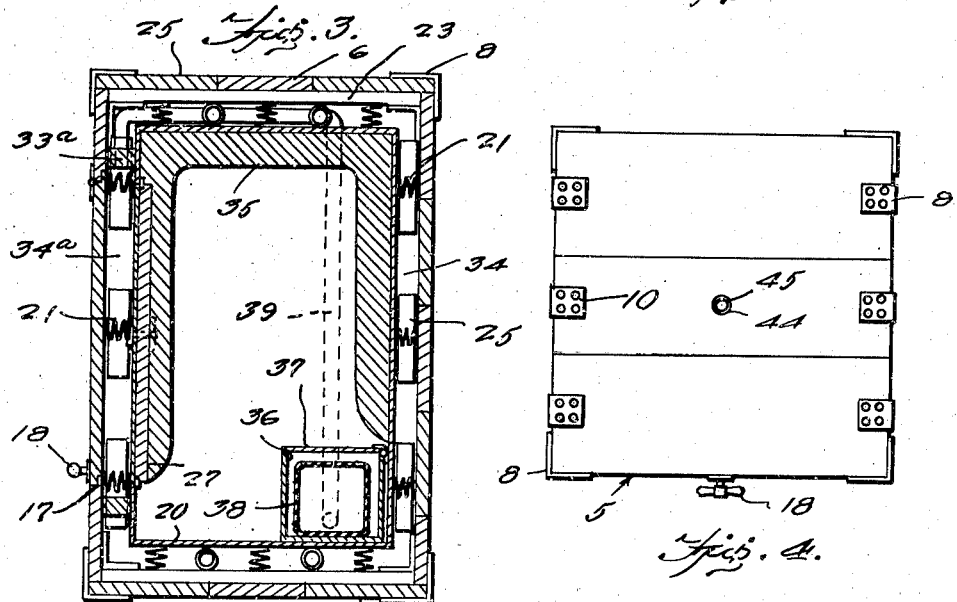
Inventor
P. D. Balzano July 12, 1949.   P. D. BALZANO   2,475,688
AIRPLANE SAFETY DEVICE.
Filed May 22, 1945   2 Sheets-Sheet 2
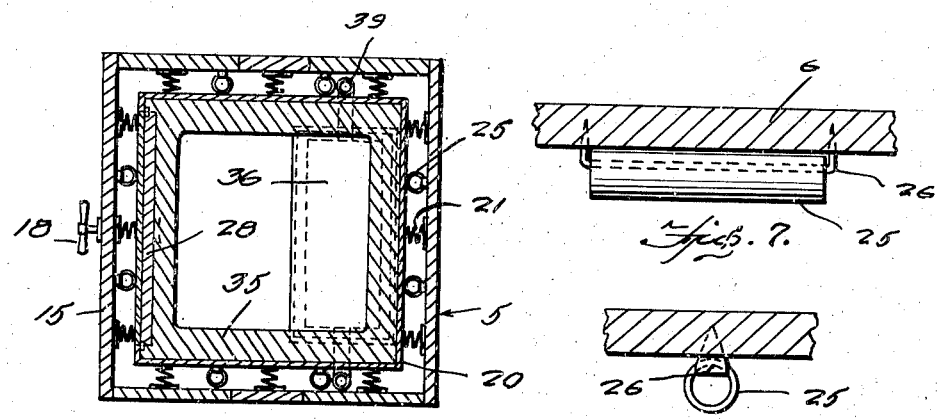
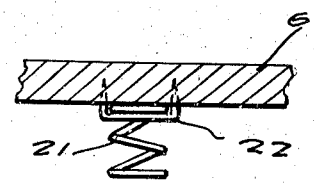
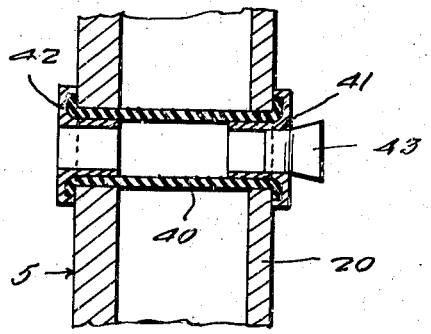
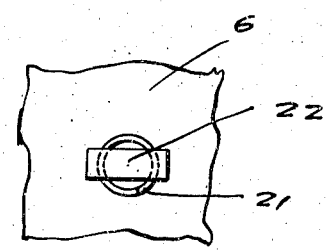
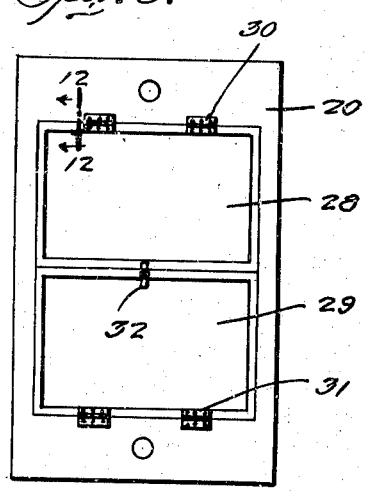
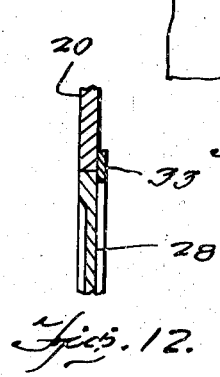
Inventor.
P. D. Balzano Patented July 12, 1949

2,475,688

UNITED STATES PATENT OFFICE 2,475,688

AIRPLANE SAFETY DEVICE

Peter D. Balzano, Cleveland, Ohio

Application May 22, 1945, Serial No. 595,200

5 Claims. (Cl. 244—121)

The present invention relates to new and useful improvements in safety devices for airplanes, and more particularly to a safety chamber adapted to be carried in the airplane and in which a passenger of the airplane may enter in case of a crash landing and embodying means to protect the passenger from injury.

While an aviator is frequently able to bring his plane down safely should the engine stall, emergencies frequently occur in which he is unable to do so, and in which there is no time for the pilot or passenger to use parachutes. The pilot and his passenger in such cases necessarily fall with the plane and which frequently results in serious injury or death.

Accordingly, it is an object of the present invention to provide means for adequately protecting the passenger, or pilot, or both, against injury during the crashing of the airplane.

An important object of the present invention is to provide a cushioned chamber or booth adapted to be carried in the airplane and in which the passenger or pilot may enter and designed to cushion the blow of impact of the airplane to which the passenger or pilot would be normally subjected.

A further object of the invention is to provide a device of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view.

Figure 2 is a side elevational view.

Figure 3 is a vertical sectional view taken substantially on line 3—3 of Figure 1.

Figure 4 is a top plan view.

Figure 5 is a transverse sectional view taken substantially on a line 5—5 of Figure 2.

Figure 6 is an enlarged fragmentary sectional view taken substantially on a line 6—6 of Figure 1.

Figure 7 is an enlarged detail of one of the tubular bumpers forming part of the invention.

Figure 8 is an end elevational view thereof.

Figure 9 is a side elevational view of one of the spring bumpers.

Figure 10 is an end elevational view thereof.

Figure 11 is a view in elevation of the inside of the door for the compartment.

Figure 12 is a sectional view taken substantially on a line 12—12 of Figure 11.

Figure 13 is an enlarged fragmentary sectional view of one of the corner braces for the compartment.

Referring now to the drawings in detail, wherein for the purpose of illustration I have disclosed a preferred embodiment of the invention, the numeral 5 designates the chamber generally and which comprises a box-like container preferably formed of strong wooden planks 6 connected at their corners by inner and outer corner braces 7 and 8 secured to each other by means of bolts or the like 9, the braces being of rigid metal construction.

The top and bottom edges of the chamber are also provided with metal braces 10.

The front of the chamber is provided with upper and lower planks 11 and 12 connected to the sides of the chamber by means of metal braces 13, the upper and lower planks defining an opening 14 in the front of the chamber adapted to be closed by a door 15 hinged, as at 16, at its upper edge to the upper plank 11, as shown to advantage in Figure 1 of the drawings.

The upper and lower edges of the door are rabbeted in the adjacent edges of the planks 11 and 12, as shown at 17 in Figure 3 of the drawings, and the lower edge of the door is secured in closed position by a conventional form of catch device 18 operable from the outside of the chamber.

The side edges of the door 15 are also provided with angle braces 19 which extend inwardly along the opposite side of the chamber, the braces 19 being secured to the door at the front thereof and free of the sides of the chamber to permit opening and closing swinging movement of the door.

An inner chamber or container 20 is placed in the chamber 5 in spaced relation from the walls of the latter, the chamber 20 being preferably constructed of rigid metal.

The inner chamber 20 is yieldably maintained in spaced relation from the adjacent walls of the outer container 5 by means of coil springs 21 secured to the plank 6 by means of staples 22, to thus provide a chamber 34 between the walls of the chamber 20 and the outer container 5. Reinforcing planks 23 are also positioned in the top and bottom of the chamber 5 to reinforce the top and bottom thereof.

Tubular rubber bumpers 25 are also placed between the walls of the chambers 5 and 20 and are likewise secured to the planks 6 by elongated staples 26.

The front wall of the inner chamber 20 is provided with an opening 27 registering with the opening 14, the opening 27 being closed by upper and lower doors 28 and 29 hinged respectively to the upper door edges of the opening by hinges 30 and 31. The free edges of the doors 28 and 29 are secured in closed position by a conventional form of catch 32.

One or more of the coil springs 21 are also positioned between the doors 15 and 28 and 29.

The doors 28 and 29 are provided with sealing strips or gaskets 33 at the edges thereof and a water-tight spacing strip 33a is positioned between the walls of the outer container 5 and inner chamber 20 around the doors to also provide a water chamber 34a between the doors.

Accordingly, when the doors 15 and 28 and 29 are secured in their closed position, an air and liquid-tight chamber 34 is formed between the chambers 5 and 20, and if desired, the door 15 may also be provided with suitable sealing gaskets.

The top and upper portions of the side walls of the inner chamber 20 are lined with a suitable padding 35 and a substantially rectangular-shaped box 36 is placed in the chamber 20 on the bottom thereof and provided with a hinged lid 37. Positioned in the box 36 is a rubber water tank 38 having a pair of tubes 39 extending upwardly therefrom through the chamber 34 to the upper portion of the chamber 34a between the doors for supplying water thereto.

Accordingly, when a person seals himself in the inner chamber 20 and by opening the lid 37 and pressing on the rubber tank 38, water will be forced upwardly through the tube 39 for partly filling the chamber 34a to thus provide further cushioning means between the doors. The water admitted to the chamber will compress the captive air and can flow in any direction around the inner box in case of an impact of the outer box with the ground.

In order to admit air from the atmosphere into the inner chamber 20, a rubber tube 40 extends through the walls of the chambers 5 and 20, the inner and outer ends of the tube being secured in position by inner and outer hollow caps 41 and 42, as shown in detail in Figure 6 of the drawings. A plug 43 is removably inserted in the inner cap 41 to be removed by the occupant of the inner chamber 20 to admit air thereto, when desired. The chamber 34 is filled with water through a filler opening 44 having a plug 45 and water may be drained by means of an opening 46 also provided with a plug 47.

In the operation of the device, the chamber 5 is placed in an airplane (not shown) and secured therein in any suitable manner and when there is danger of a crash landing, a passenger or pilot enters the chamber 20 and seals the door 28 and 29, the outer door 15 automatically closing by gravity and sealing itself by the catch 18.

Water is then pumped into the chamber between the inner and outer doors from the tank 38 and the occupant of the chamber 20 is thus protected from injury upon the crashing of the airplane.

It is believed the details of construction, manner of use and advantages of the device will be readily understood from the foregoing without further detailed explanation.

While I have illustrated and described a preferred embodiment of the invention, it will be apparent that minor changes in construction may be resorted to without departing from the spirit of the invention or the scope of the appended claims.

Having thus described the invention, what I claim is:

1. A safety device for airplanes comprising inner and outer chambers movable relative to one another adapted to be carried in the airplane, doors in said chambers adapted to admit an occupant thereto, said inner chamber being spaced from the walls of the outer chamber, cushioning means between the walls of the inner and outer chambers, and means carried by said inner chamber for supplying liquid between the walls of said chambers.

2. A safety device for airplanes comprising inner and outer chambers movable relative to one another adapted to be carried in the airplane, doors in said chambers adapted to admit an occupant thereto, said inner chamber being spaced from the walls of the outer chamber, cushioning means between the walls of the inner and outer chambers, a rubber water tank in said inner chamber, and a tube extending from said tank between the walls of the inner and outer chambers, said tank being adapted to supply water between the inner and outer chambers by the manual application of pressure to said tank.

3. A safety device for airplanes comprising rigid inner and outer chambers movable relative to one another adapted for placing in an airplane, doors in said chambers adapted to admit an occupant thereto, said inner chamber being spaced from the walls of said outer chamber, cushioning means between the walls of said chambers, and a cushioned lining within said inner chamber.

4. A safety device for airplane occupants and adapted to be carried in an airplane, said device comprising a rigid outer chamber, a rigid inner chamber of smaller dimensions than and positioned in the outer chamber, yieldable means completely spacing the inner from the outer chamber, cushioning means on inner surfaces of the inside chamber, and door and closure means associated with both chambers whereby an airplane occupant may enter and close himself inside the inner chamber.

5. A safety device for airplane occupants and adapted to be carried in an airplane, said device comprising a rigid outer chamber, a rigid inner chamber of smaller dimensions than and positioned in the outer chamber, yieldable means completely spacing the inner from the outer chamber, a door associated with both chambers whereby an airplane occupant may enter the inner chamber, means on each of said doors for sealing the closed chambers, and air inlet means for the inner chamber.

PETER D. BALZANO.

REFERENCES CITED

The following references are of record in the file of this patent:

UNITED STATES PATENTS

| Number | Name | Date |
| --- | --- | --- |
| 83,731 | Robbins | Nov. 3, 1868 |
| 1,027,764 | Rilleau | May 28, 1912 |
| 1,349,526 | Niedbala | Aug. 10, 1920 |
| 1,820,958 | Zinkowetsky | Sept. 1, 1931 |
| 2,240,747 | Babb et al. | May 6, 1941 |
| 2,276,700 | Provenzano | Mar. 17, 1942 |
| 2,323,455 | Creech | July 6, 1943 |